(No Model.)

R. F. STEWART.
CLUTCH.

No. 547,386.  Patented Oct. 1, 1895.

Witnesses:—
D. N. Hayford
J. E. Greer

Inventor:—
Richard F. Stewart
by James T. Law,
Attorney.

UNITED STATES PATENT OFFICE.

RICHARD F. STEWART, OF MOUNT PLEASANT, NEW YORK.

CLUTCH.

SPECIFICATION forming part of Letters Patent No. 547,386, dated October 1, 1895.

Application filed February 9, 1895. Serial No. 537,749. (No model.)

*To all whom it may concern:*

Be it known that I, RICHARD F. STEWART, a citizen of the United States, and a resident of Mount Pleasant, in the county of Westchester and State of New York, have invented certain new and useful Improvements in Clutches, of which the following is a specification.

My invention is an improvement in clutches for temporarily coupling adjoining shafts or connecting together various mechanical mechanism; and it consists of a novel clutching device which is automatically operated or thrown into and out of engagement by the revolution of the shafts or other mechanism to which it is connected.

Figure 3:
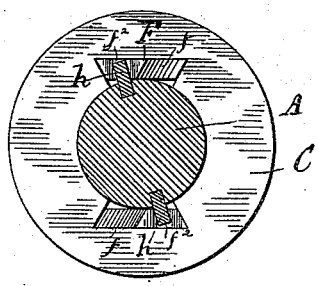
Figure 1:
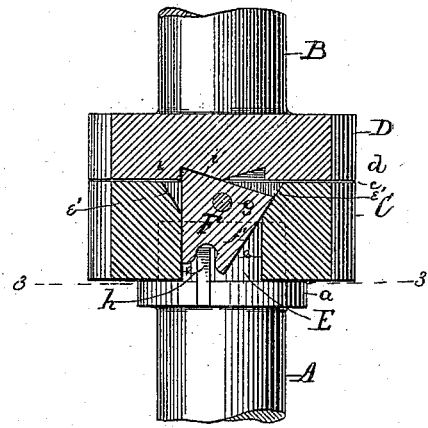
Figure 4:
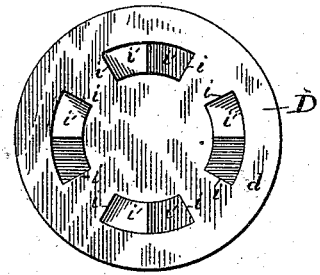
Figure 2:
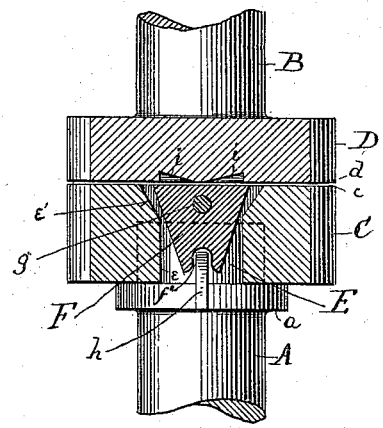
Figure 5:
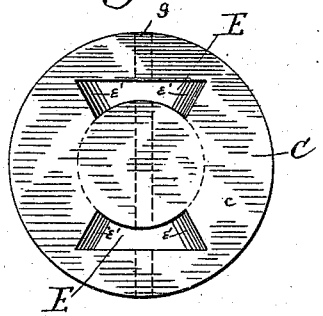

In the accompanying drawings, illustrating my improvement, Figure 1 is an elevation, partly in section, showing the clutch in engagement. Fig. 2 is the same as Fig. 1, showing the clutch out of engagement. Fig. 3 is a sectional view through the line 3 3, Fig. 1. Fig. 4 is a view of the inner face of the collar on one of the shafts, and Fig. 5 is a view of the inner face of the collar on the other shaft.

A is the driving-shaft to which the power is applied.

B is the adjoining shaft, which is to be driven.

C is a loose collar on the shaft A, resting and turning on the collar or rim $a$.

D is a fixed collar on the shaft B.

In the collar C are two recesses E, extending through the collar from top to bottom and located on opposite sides of the central shaft. The sides $e\ e$ of these recesses are parallel to the axis of the shaft except at the outer face $c$ of the collar C, where they slope outward, as at $e'\ e'$. Within each of the recesses E is hung a loose key or piece F, fastened to the collar by means of the pin $g$, so as to turn freely thereon. These keys, as shown in the drawings, are wedge shape, and are so placed in the recess that when in their normal position the top of the key will be even or flush with the face of the collar C, and are of such a size with respect to the size of the recess that when turned on the pin $g$ as far as possible, until one of their edges, as $f$, rests against the parallel side $e$ of the recess on one side of the latter, the opposite edge will rest against the inclined side $e'$ on the other side of the recesses, and the upper corner of the wedge will be thrown out beyond the face $c$ of the collar C, as shown in Fig. 1. The keys F are caused to turn in the recesses by the studs or projections $h$ on the shaft A, which rest in cavities $f^2$ in the apex of the wedge-shaped keys. The keys are thus connected to the shaft by the studs $h$, and, as will be understood from the drawings, when the shaft A is turned in either direction the studs $h$, engaging with the cavities $f^2$, will swing around the points of the wedge-shaped keys in the same direction until the edges of the keys rest against the sides of the recess, and the corner of the wedge is thus thrown out beyond the face of the collar C. As the shaft A continues to revolve, the impact of the keys against the sides of the recesses causes the collar C to revolve with it, and the two move together as long as the shaft revolves.

In the outer face $d$ of the collar D are inclined recesses $i$, having the edges $i'$ perpendicular to the face $d$ of the collar. The shape and size of these recesses $i$ are such that they will receive, when the two collars C and D are close together, the projecting corners of the wedge-shaped keys F when the latter are thrown out by the turning of the keys in the recesses by the shaft A, as before described and as shown in Fig. 1. As will be understood from the drawings, when the corner of the key projects into the recess $i$ the edge of the key rests against the side $i'$ of the recess, and hence as the collar C is revolved the collar D is made to revolve with it. It therefore follows that the shafts are coupled or connected together by the keys F, and as long as the corner of the key rests in the recess $i$ the two shafts will revolve together, and when for any reason the key is withdrawn from the recess in the collar D the two shafts will be disconnected and can revolve separately. It will be seen from the above description that the key is brought into engagement with the recess in the collar D, and thus the two shafts locked together, simply by the revolution of the shaft A, which turns the key and throws out the corner into the recess $i$; and hence to bring the clutch into engagement and cause the adjoining shaft B to turn it is only necessary to revolve the shaft A when the two shafts are locked and turn together. If for any reason the shaft B revolves faster than the shaft A, it will be seen that the sides $i'$ of the recess $i$ will move away from the edge of the key and the inclined side of the recess will press against the top of the wedge and turn the latter until it is out of engagement with the recess and the top of the key is even with the face of the collar C in the position shown in Fig. 2. As long as the shaft B continues to revolve at a greater speed than the shaft A the key is held by the collar D with its top edge even with the face of the collar C and out of engagement, but when the shaft A revolves faster than or at the same speed as the shaft B the key is turned in the recess in the collar C and is thrown into engagement with the recess in the collar D and the two shafts locked together. The clutch is thus brought into and out of engagement automatically by varying the speed of the two shafts and without any other mechanism.

In practice if the clutch is in engagement and the two shafts revolving together and it is desired to disconnect them, the shaft A is stopped or made to go slower, when the clutch is at once thrown out of engagement and the shaft B revolves free of shaft A; and if for any reason, while the clutch is in engagement and the two shafts are revolving together, the shaft B is caused to revolve faster than the shaft A it at once throws the clutch out of engagement, frees itself from the shaft A, and revolves alone, thus preventing any sudden strain on the driving-shaft by reason of the increased speed of the connecting-shaft.

As will be evident, my automatic clutch may be used with various forms of mechanism.

I claim—

1. In a clutch for coupling mechanism, in combination, a driving shaft, a member mounted on such shaft and a dog connected to such member and adapted to be actuated and thrown into engagement by the revolution of the shaft; and an adjoining shaft arranged to receive the dog when in engagement, and adapted to disengage the latter by an increase of its speed, substantially as described.

2. In a clutch for coupling mechanism, in combination, a driving shaft, a member mounted on such shaft, and a dog connected to such member so as to move thereon, mechanism on the driving shaft engaging with the dog, whereby the dog is actuated by the revolution of the shaft and thrown into engagement with the adjoining shaft, and an adjoining shaft provided with recesses adapted to receive the dog when in engagement and to disengage the latter by an increase in the speed of the adjoining shaft, substantially as described.

3. In a clutch for coupling mechanism, in combination, a driving shaft; a collar C mounted on the same and provided with a recess E; a dog F contained in the recess and capable of moving therein; mechanism on the driving shaft arranged and adapted to engage with the dog, whereby the latter is actuated by the revolution of the shaft; and the member D rigidly secured to the adjoining shaft and having the recess $i$ adapted to receive the edge of the dog, whereby the two shafts are locked together, substantially as described.

RICHARD F. STEWART.

Witnesses:
J. E. GREER,
FRED. S. KEMPER.